(12) United States Patent
Park et al.

(10) Patent No.: US 12,159,735 B2
(45) Date of Patent: Dec. 3, 2024

(54) CHARGING CABLE

(71) Applicant: LG ELECTRONICS INC., Seoul (KR)

(72) Inventors: Naehyun Park, Seoul (KR); Jiho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/569,559

(22) PCT Filed: Nov. 18, 2022

(86) PCT No.: PCT/KR2022/018304
§ 371 (c)(1),
(2) Date: Dec. 12, 2023

(87) PCT Pub. No.: WO2024/106575
PCT Pub. Date: May 23, 2024

(65) Prior Publication Data
US 2024/0266089 A1    Aug. 8, 2024

(51) Int. Cl.
*H01B 7/42*    (2006.01)
*H01B 7/02*    (2006.01)
*H02J 7/00*    (2006.01)

(52) U.S. Cl.
CPC .................... *H01B 7/423* (2013.01)

(58) Field of Classification Search
CPC ...... H01B 7/423; H01B 7/425; H01B 7/0241; H02J 7/00
See application file for complete search history.

(56) References Cited

U.S. PATENT DOCUMENTS

| | | | |
|---|---|---|---|
| 5,591,937 A * | 1/1997 | Woody | B60L 53/18 174/15.1 |
| 2012/0199390 A1 | 8/2012 | Oka et al. | |
| 2015/0217654 A1 | 8/2015 | Woo et al. | |
| 2019/0237218 A1 | 8/2019 | Heyne et al. | |

(Continued)

FOREIGN PATENT DOCUMENTS

| | | |
|---|---|---|
| CN | 206741986 | 12/2017 |
| CN | 113140361 | 7/2021 |

(Continued)

OTHER PUBLICATIONS

PCT International Application No. PCT/KR2022/018304, International Search Report dated Aug. 11, 2023, 3 pages.

(Continued)

*Primary Examiner* — Hoa C Nguyen
*Assistant Examiner* — Amol H Patel
(74) *Attorney, Agent, or Firm* — LEE, HONG, DEGERMAN, KANG & WAIMEY

(57) ABSTRACT

The present embodiment comprises an outer tube; and at least one charging line disposed inside the outer tube, in which an outer flow path through which cooling fluid passes is formed between the outer tube and the at least one charging line, the charging line comprises at least one charging conductor; and an insulating body surrounding the outer circumference of the at least one charging conductor, and in which an inner flow path through which cooling fluid passes is formed in the insulating body.

14 Claims, 11 Drawing Sheets

(56) References Cited

U.S. PATENT DOCUMENTS

2022/0314822 A1 10/2022 Kim et al.
2022/0410743 A1 12/2022 Choi

FOREIGN PATENT DOCUMENTS

| | | |
|---|---|---|
| JP | 6285624 | 4/1987 |
| JP | 01309212 | 12/1989 |
| JP | 07029525 | 7/1995 |
| JP | 2012164478 | 8/2012 |
| KR | 101952159 | 2/2019 |
| KR | 20210029117 | 3/2021 |
| KR | 1020210029117 | 3/2021 |
| KR | 20210055001 | 5/2021 |
| KR | 1020210055001 | 5/2021 |
| KR | 1020210065614 | 6/2021 |
| WO | 2007032391 | 3/2007 |

OTHER PUBLICATIONS

Korean Intellectual Property Office Application No. 10-2023-7040345, Office Action dated Apr. 9, 2024, 9 pages.

\* cited by examiner

【FIG. 1】
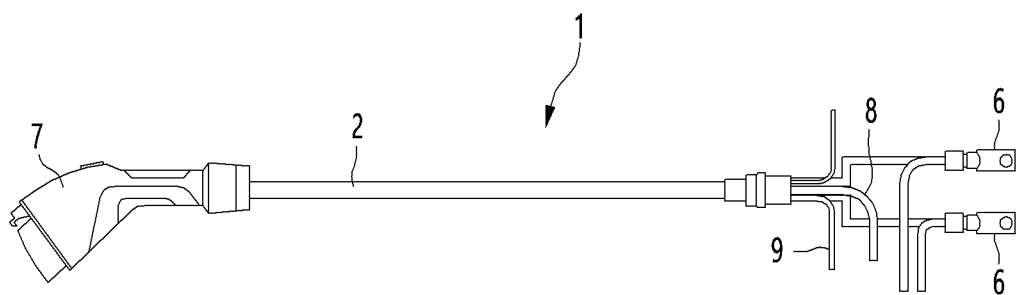
【FIG. 2】
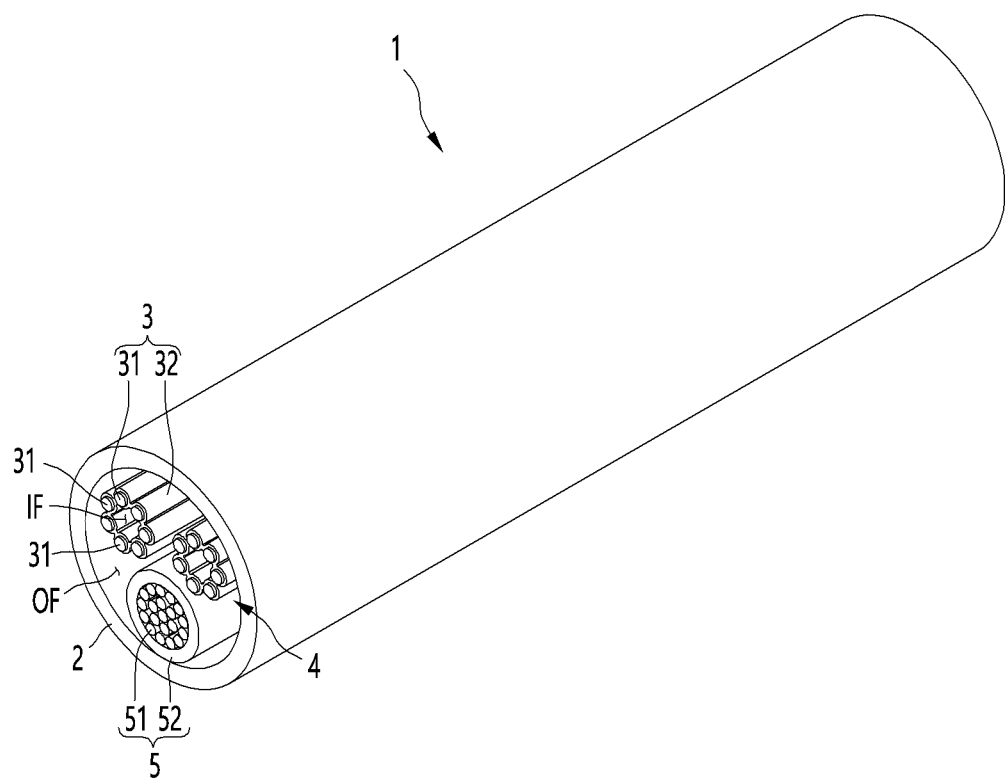

[FIG. 3]
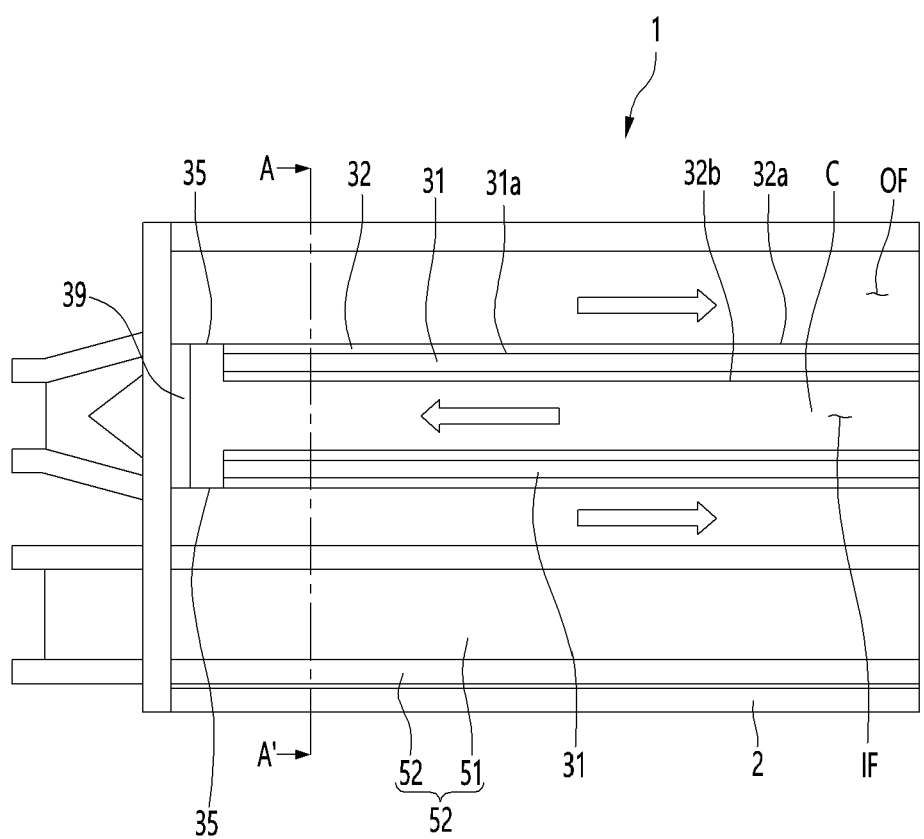

[FIG. 4]
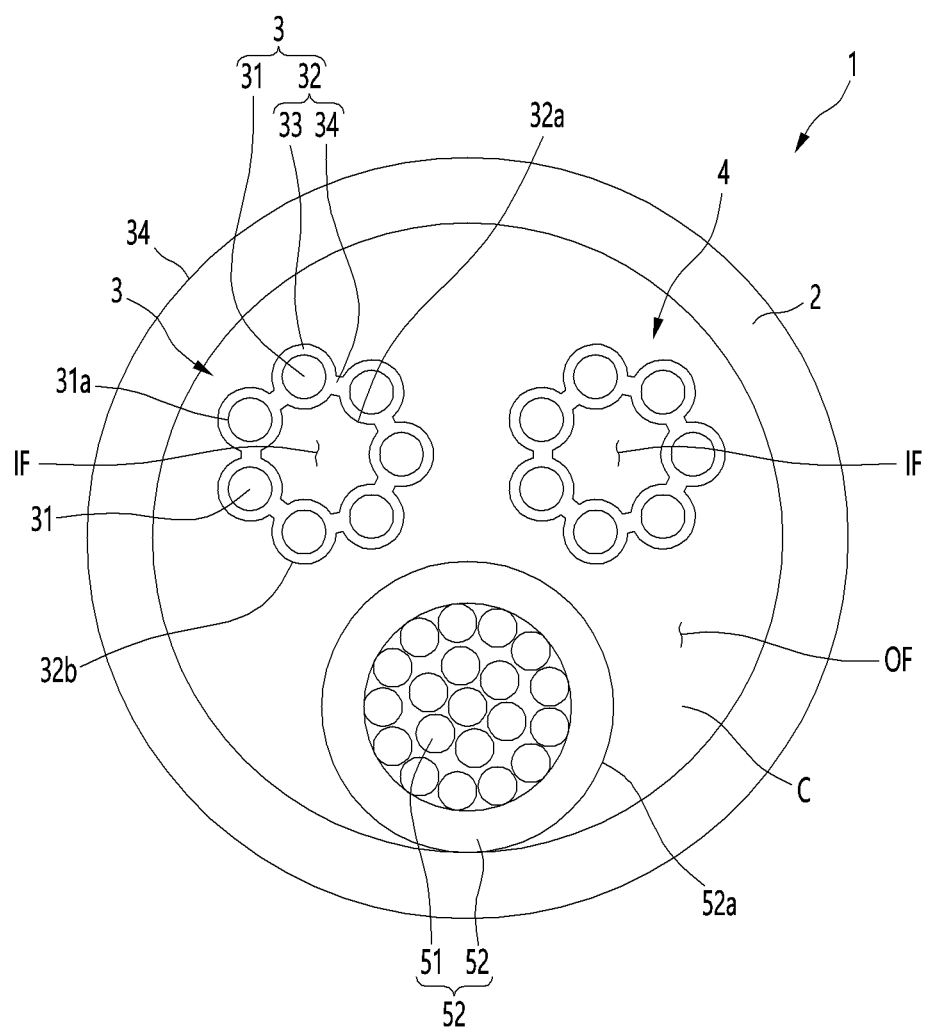

[FIG. 5]
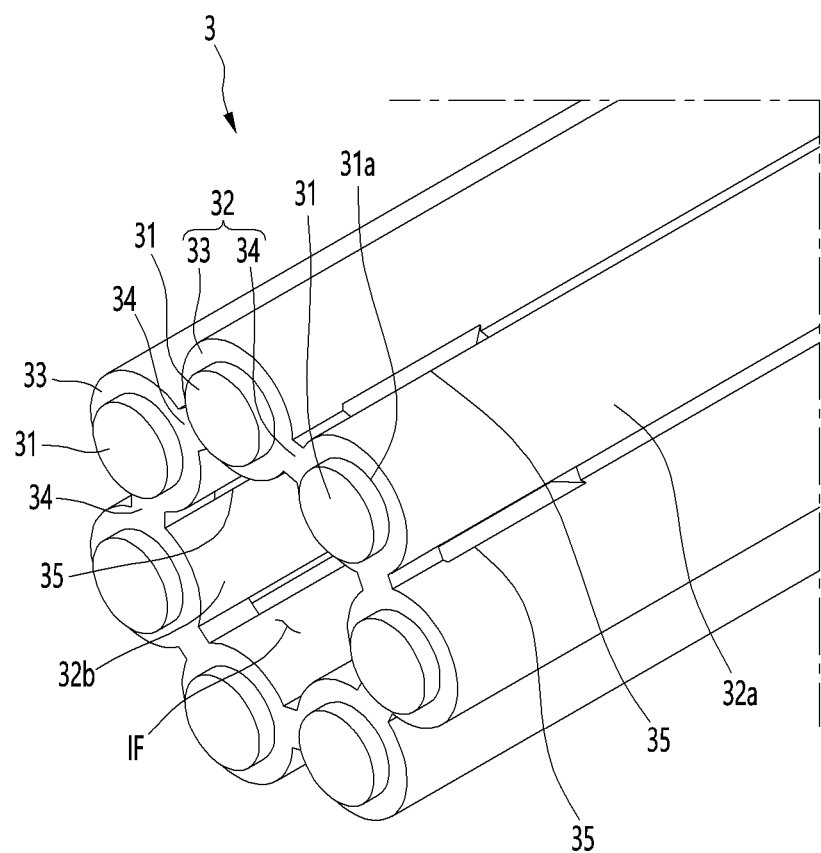

[FIG. 6]
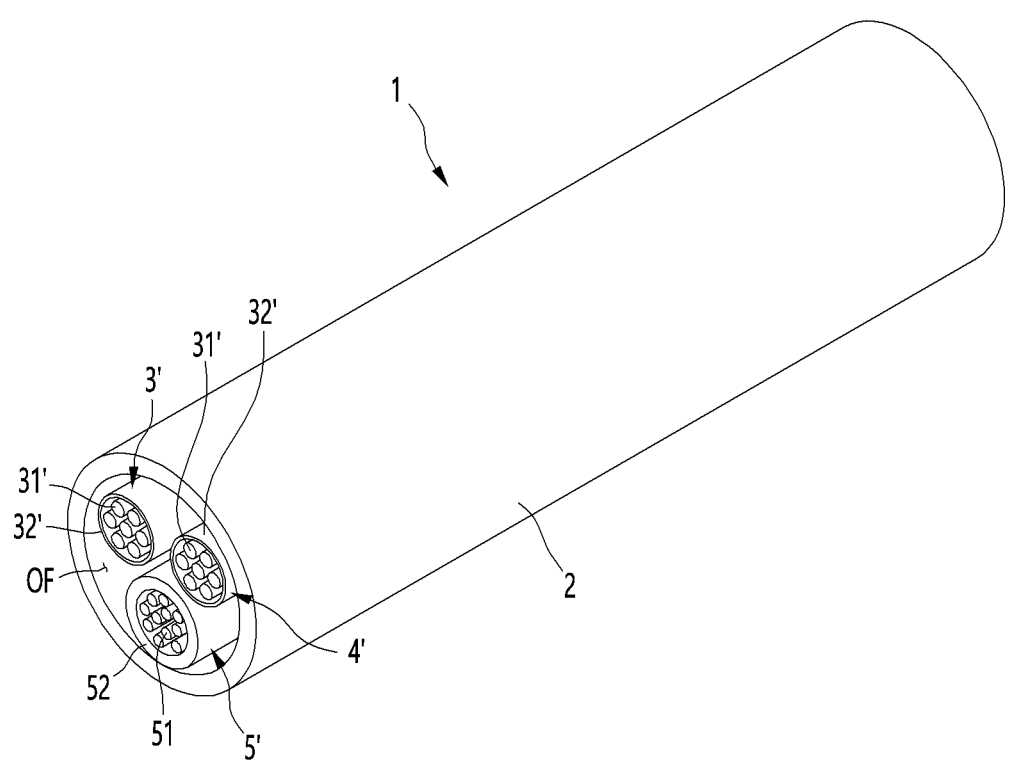

[FIG. 7]
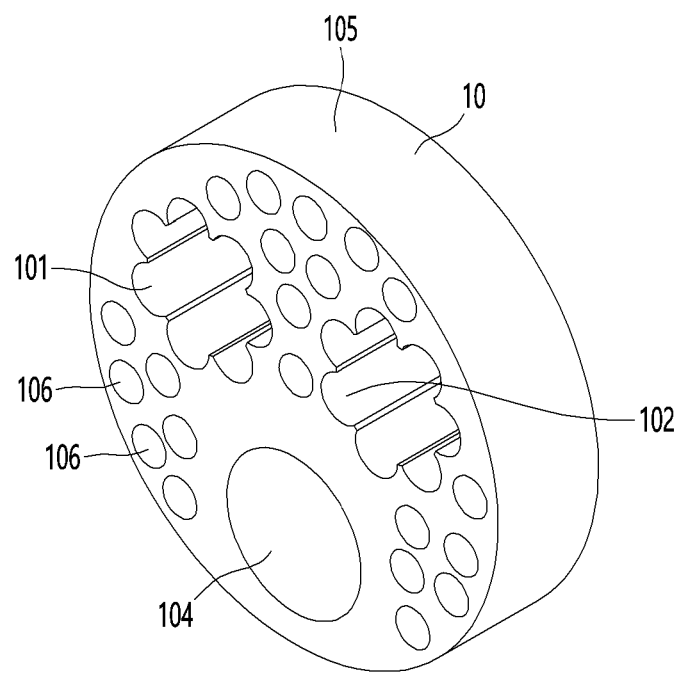

[FIG. 8]
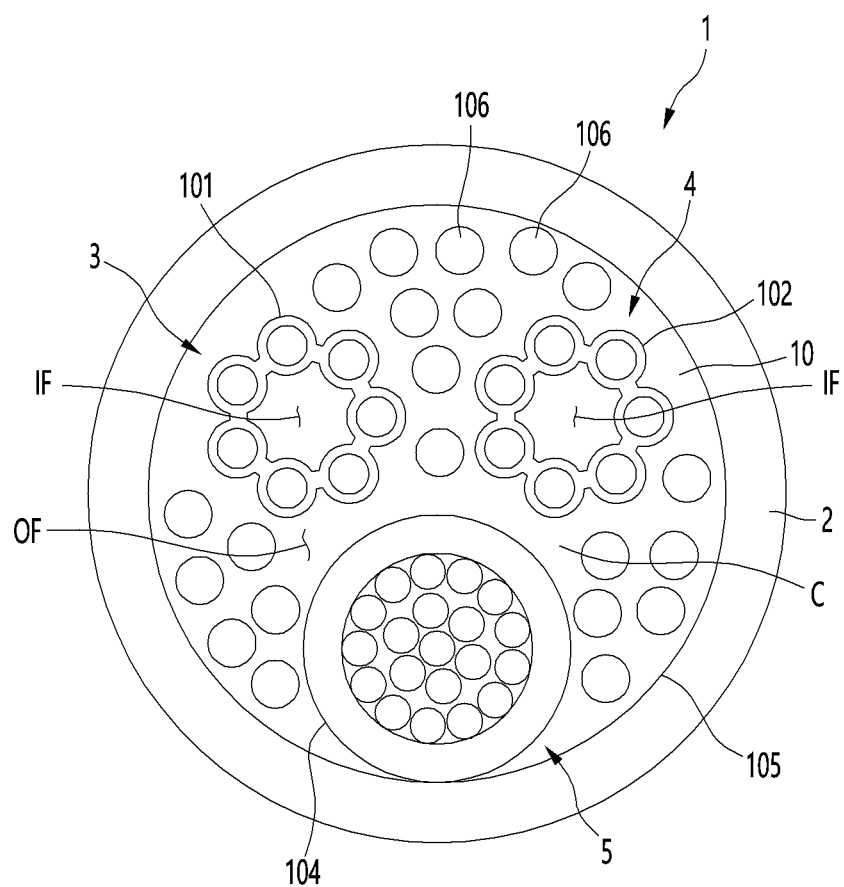

[FIG. 9]
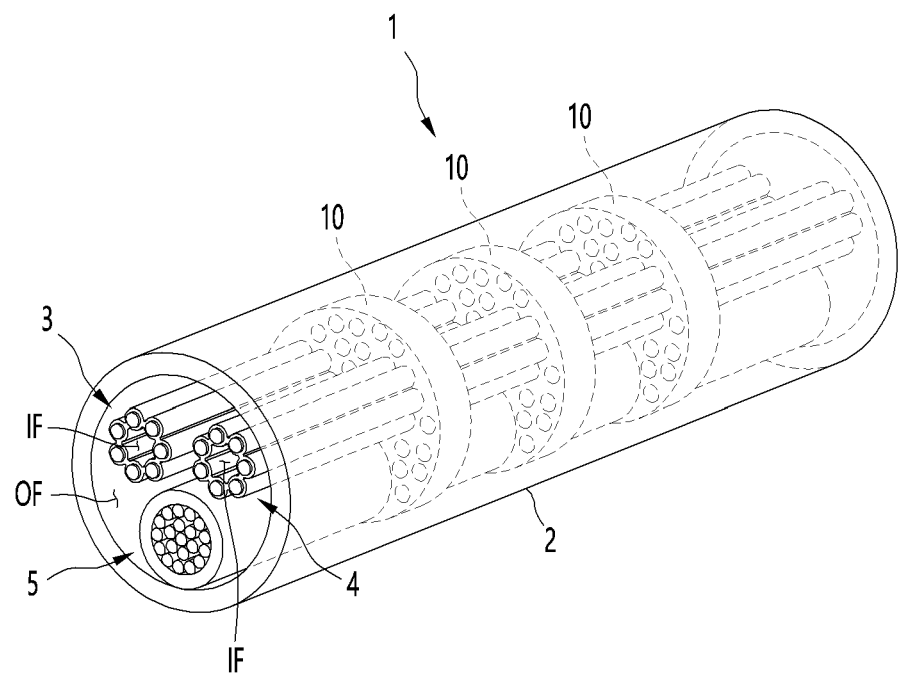

[FIG. 10]
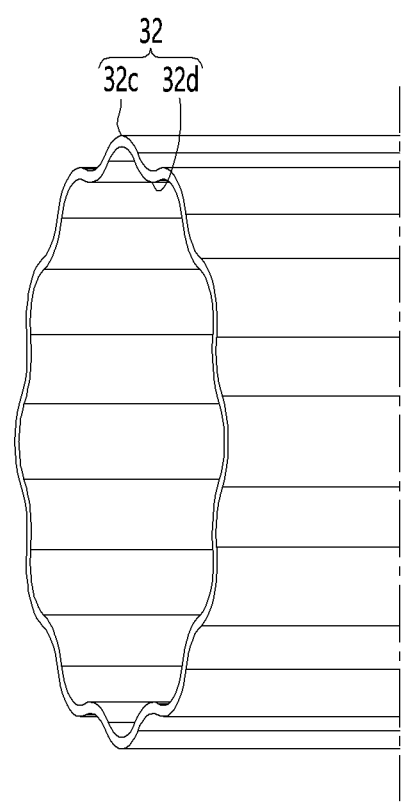

【FIG. 11】
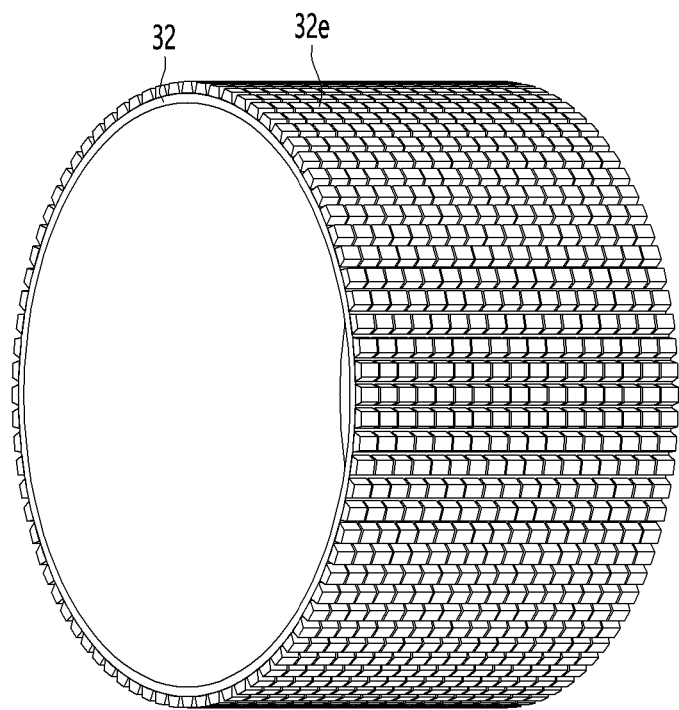
【FIG. 12】
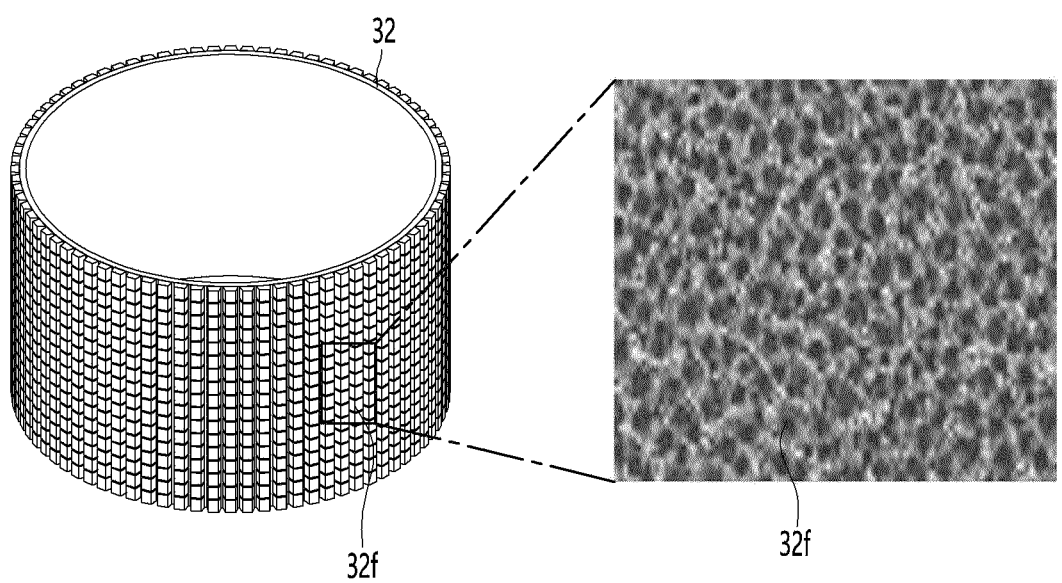

[FIG. 13]
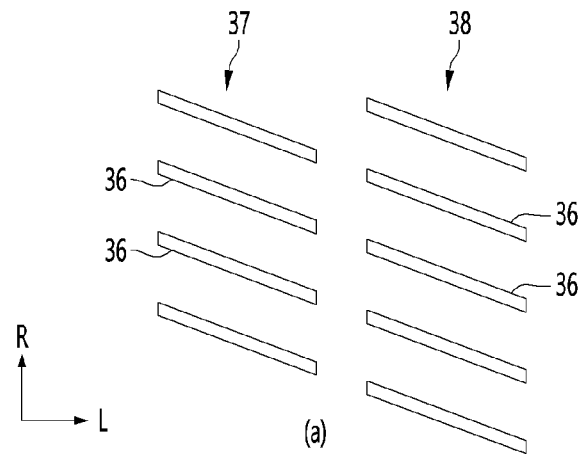
(a)
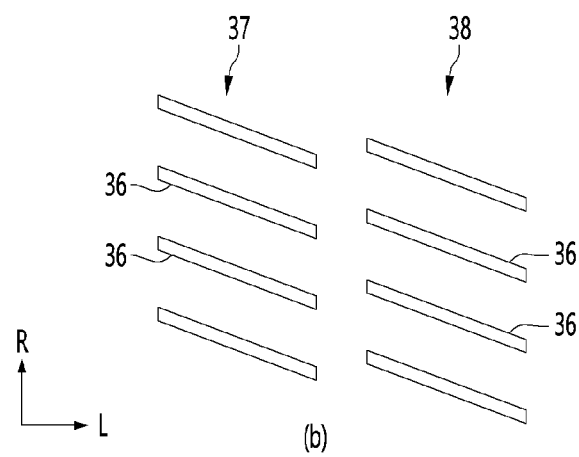
(b)
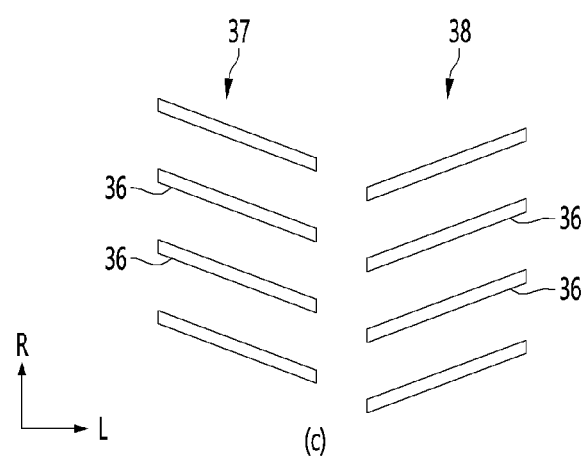
(c)

CHARGING CABLE

CROSS-REFERENCE TO RELATED APPLICATION(S)

This application is the National Stage filing under 35 U.S.C. 371 of International Application No. PCT/KR2022/018304, filed on Nov. 18, 2022, the contents of which are all incorporated by reference herein in its entirety.

TECHNICAL FIELD

The present disclosure relates to a charging cable for charging electric vehicles or the like.

BACKGROUND ART

The development of electric vehicles has created an increased need for charging devices that deliver power.

The higher the current in any conductor, the more heat is generated. As a result, the conductors between the charging device and the vehicle have become larger in size to accommodate higher inrush currents.

An example of a charging system capable of charging an electric vehicle is the charging system for an electric vehicle disclosed in Republic of Korea Patent Publication No. 10-1952159 B1 (published on Feb. 26, 2019), and the charging system for an electric vehicle comprises a power supply; a cable having a first end portion and a second end portion, the first end portion being attached to the power supply, the cable having a conductor and a cooling pipe each extending from the first end portion to the second end portion; and a connector attached to the second end portion of the cable and having a form factor corresponding to a charging port of the electric vehicle, and the cooling pipe may be in contact with a conductor.

DISCLOSURE

Technical Problem

An abject of the present embodiment is to provide a charging cable that can cool the charging line more quickly by maximizing the heat transfer area between the cooling fluid and the charging line.

An abject of the present embodiment is to provide a charging cable whose diameter can be minimized by allowing cooling fluid to pass through the charging line.

Technical Solution

A charging cable according to the present embodiment may comprise an outer tube; and at least one charging line disposed inside the outer tube, in which an outer flow path through which cooling fluid passes may be formed between the outer tube and the at least one charging line.

The charging line may comprise at least one charging conductor; and an insulating body surrounding the outer circumference of the at least one charging conductor, and an inner flow path through which cooling fluid passes may be formed in the insulating body.

The inner flow path may be formed inside the insulating body.

The insulating body may comprise an inner circumference forming the inner flow path; and an outer circumference spaced apart from the inner circumference of the outer tube.

The insulating body may comprise a plurality of insulating portions surrounding the charging conductor, and adjacent insulating portions may be connected to a bridge portion.

The bridge portion may comprise a cooling fluid recovery hole through which cooling fluid passes.

The cooling fluid recovery hole may be formed to be long in a longitudinal direction of the insulating body.

The charging cable of may further comprise a cooling fluid supply unit configured to supply cooling fluid to the inner flow path, and a cooling fluid recovery unit through which the cooling fluid passing through the outer flow path is guided.

The cross-sectional area of the inner flow path may be smaller than the cross-sectional area of the outer flow path.

The insulating body may comprise peaks and valleys which are alternately formed in a circumferential direction.

The insulating body may comprise uneven portions.

The insulating body may comprise a porous member.

A flow guide may protrude from the insulating body to guide the flow of cooling fluid.

The flow guide may have a spiral shape.

The charging cable may further comprise a communication line disposed inside the outer tube.

The outer flow path may be formed between the outer circumference of the charging line, the outer circumference of the communication line, and the inner circumference of the outer tube.

The charging cable may further comprise a supporter disposed inside the outer tube, in which the supporter may comprise a charging line through-hole through which the charging line passes, and a communication line through-hole through which the communication line passes.

The supporter may support the charging line and the communication line so that the outer circumference of the charging line and the outer circumference of the communication line are spaced apart from the inner circumference of the outer tube.

Advantageous Effect

According to the present embodiment, the charging line can be cooled while the cooling fluid sequentially passes through the inner flow path inside the insulating body and the outer flow path outside the insulating body, so the heat transfer area can be maximized and the charging line can be cooled more quickly and efficiently.

In addition, a double pipe can be formed by an outer tube and an insulating body, and the length of the cooling flow path can be increased to effectively cool the heat generated by the charging conductor.

In addition, the heat transfer area is increased by the uneven portion of the insulating body, porous members, or flow guides, allowing for more effective cooling of the charging conductors.

DESCRIPTION OF DRAWINGS

FIG. 1 is a side view illustrating an example of a charging cable according to the present embodiment;

FIG. 2 is a partially cut away perspective view illustrating an example of a charging cable according to the present embodiment;

FIG. 3 is a cross-sectional view illustrating a portion of an example of a charging cable according to the present embodiment;

FIG. 4 is a cross-sectional view taken along line A-A' of FIG. 3;

FIG. 5 is a partially cut away perspective view illustrating an example of a charging line according to the present embodiment;

FIG. 6 is a partial cutaway perspective view illustrating a comparative example compared to an example of a charging cable according to the present embodiment;

FIG. 7 is a perspective view illustrating a supporter according to the present embodiment;

FIG. 8 is a cross-sectional view illustrating an example in which the supporter according to the present embodiment is installed inside the outer tube;

FIG. 9 is a perspective view illustrating an example in which the supporter according to the present embodiment is installed inside the outer tube;

FIG. 10 is a view illustrating a first modified example of an insulating body according to the present embodiment;

FIG. 11 is a view illustrating a second modified example of the insulating body according to the present embodiment;

FIG. 12 is a view illustrating a third modified example of the insulating body according to the present embodiment;

FIG. 13 is a view illustrating a fourth modified example of the insulating body according to the present embodiment.

BEST MODE

Hereinafter, specific embodiments of the present disclosure will be described in detail along with the drawings.

FIG. 1 is a side view illustrating an example of a charging cable according to the present embodiment, FIG. 2 is a partially cut away perspective view illustrating an example of a charging cable according to the present embodiment, FIG. 3 is a cross-sectional view illustrating a portion of an example of a charging cable according to the present embodiment, FIG. 4 is a cross-sectional view taken along line A-A' of FIG. 3, and FIG. 5 is a partially cut away perspective view illustrating an example of a charging line according to the present embodiment.

The charging cable 1 may comprise an outer tube 2 and a charging line. The charging cable 1 may further comprise a communication line.

The outer tube 2 may form an outer appearance of the charging cable 1. A space may be formed inside the outer tube 2, and a charging line and a communication line may be accommodated in the space.

The outer tube 2 may be an outer jacket, and the outer jacket may accommodate a charging line and a communication line, and the cooling fluid C may pass through the outer jacket.

A plurality of charging lines may be provided inside the outer tube 2. Hereinafter, a pair of charging lines 3 and 4 will be described as being disposed inside the outer tube 1. The present embodiment is not limited to a pair of charging lines 3 and 4 being accommodated inside the outer tube 2, it is of course possible for three or more charging lines to be disposed, and the number of charging lines is not limited. A pair of charging lines 3 and 4 may be formed with the same structure, and hereinafter, for convenience of explanation, will be collectively referred to as the charging lines 3.

The charging line 3 may comprise at least one charging conductor 31 and an insulating body 32.

A plurality of charging conductors 31 may be provided in one charging conductor 3. The plurality of charging conductors 31 may be disposed to be spaced apart from each other by the insulating body 32 along the circular trajectory of the insulating body 32. In other words, the plurality of charging conductors 31 may be spaced apart in the circumferential direction of the insulating body 32.

The insulating body 32 may be an electrically insulating insulator, and the insulating body 32 may be a charging sheath capable of insulating at least one charging conductor 31. The insulating body 32 may be a heat transfer member that can transfer the heat of the charging conductor 31 to the cooling fluid C (see FIG. 4).

The insulating body 32 may surround the outer circumference 31a (see FIG. 4) of at least one charging conductor 31. An inner flow path IF through which the cooling fluid C passes may be formed in the insulating body 32. The inner flow path IF may be formed inside the insulating body 32 and may be long in the longitudinal direction of the insulating body 32. The cross-sectional area of the inner flow path IF may be smaller than the cross-sectional area of the outer flow path OF, which will be described later.

The insulating body 32 may be a charging sheath with an inner flow path IF formed therein. The insulating body 32 may be formed in a hollow shape, and the insulating body 32 may comprise an outer circumference 32a and an inner circumference 32b.

The outer circumference 32a of the insulating body 32 may be spaced apart from the inner circumference of the outer tube 2.

The inner circumference 32b of the insulating body 32 may form an inner flow path IF.

The inner flow path IF may be formed inside the inner circumference 32b of the insulating body 32. The inner flow path IF may be formed inside the insulating body 32 to be long in the longitudinal direction of the insulating body 32.

The insulating body 32 may comprise an insulating portion 33 and a bridge portion 34, as illustrated in FIGS. 4 and 5.

The insulating portion 33 may surround the outer circumference 31a of the charging conductor 31. The cross section of the insulating portion 33 may be ring-shaped. The insulating body 32 may comprise a plurality of insulating portions 33.

One charging conductor 31 may be accommodated inside one insulating portion 33.

The plurality of insulating portions 33 may be formed in a row along a circular trajectory. The plurality of insulating portions 33 may be spaced apart from each other. The plurality of insulating portions 33 may be spaced apart from each other in the circumferential direction of the insulating body 32.

The bridge portion 34 may connect a pair of adjacent insulating portions 33 among the plurality of insulating portions 33. The insulating portion 33 and the bridge portion 34 may be formed alternately in the circumferential direction of the insulating body 32.

The insulating body 32 may have peaks and valleys alternately formed in the circumferential direction. The outer circumference 32a of the insulating body 32 may have peaks and valleys alternately formed in the circumferential direction. The inner circumference 32b of the insulating body 32 may have peaks and valleys alternately formed in the circumferential direction.

A cooling fluid recovery hole 35 (see FIGS. 5 and 6) through which the cooling fluid C passes may be formed in the bridge portion 34. The cooling fluid recovery hole 55 may be formed to be long in the longitudinal direction of the insulating body 32. The cooling fluid recovery hole 55 may be formed by a long slit in the longitudinal direction of the insulating body 32.

The cooling fluid recovery hole 35 may be adjacent to the opposite side of the cooling fluid supply unit 8 and the cooling fluid recovery unit 9. The cooling fluid supply unit 8 and the cooling fluid recovery unit 9 may be close to one end of one end and the other end of the inner flow path IF, and the cooling fluid recovery hole 35 may be close to the other end of one end and the other end of the inner flow path IF.

The insulating body 32 may comprise a blocking plate 39 (see FIG. 3) that blocks the other end of the inner flow passage IF. The cooling fluid C may be guided to the cooling fluid recovery hole 35 by the blocking plate 39.

The charging cable 1 may have an outer flow path OF through which the cooling fluid C passes.

The outer flow path OF may be formed between at least one charging line 3, 4 and the outer tube 2. The outer flow path OF may be formed between the outer circumference 32a of at least one charging line 3, 4 and the inner circumference of the outer tube 2.

When the charging cable 1 further comprises a communication line 5, the outer flow path OF can be formed between the outer tube 2 and at least one charging line 3, 4 and the communication line 5. The outer flow path OF may be formed between the outer circumference 32a of at least one charging line 3, 4, the outer circumference 52a of the communication line 5, and the inner circumference of the outer tube 2.

The outer flow path OF may be parallel to the inner flow path IF. The outer flow path OF may surround the outer circumference of the insulating body 32. The outer flow path OF may be spaced apart from the inner flow path IF with the insulating body 32 interposed therebetween.

The cooling fluid C may absorb heat transferred to the inner side of the insulating body 32 in the radial direction while passing through the inner flow path IF.

After passing through the inner flow path IF, the cooling fluid C may flow into the outer flow path OF through the cooling fluid recovery hole 55.

The cooling fluid C flowing into the outer flow path OF may absorb heat transferred to the outside of the insulating body 32 in the radial direction while passing through the outer flow path OF.

In other words, the cooling fluid C flowing through the charging cable 1 primarily absorbs heat from the charging conductor 31 while passing through the inside of the insulating body 32, and then heat from the charging conductor 31 can be secondarily absorbed while passing through the cooling fluid recovery hole 35 and then passing through the outside of the insulating body 32.

The communication line 5 may be placed inside the outer tube 2.

The communication line 5 may comprise a communication conductor 51 and a communication sheath 52 surrounding the outer circumference 51a of the communication conductor 51.

A plurality of communication conductors 51 may be disposed inside the communication sheath 52.

The outer circumference 52a of the communication sheath 52 may have a smooth surface.

One end of the charging cable 1 may be provided with a connection terminal 6 (see FIG. 1). A charger capable of charging an electric vehicle may comprise a power supply, and the connection terminal 6 formed at one end of the charging cable 1 may be connected to a power supply provided in the charger.

A plurality of connection terminals 6 may be provided at one end of the charging cable 1. A pair of connection terminals 6 may be provided, one of the pair of connection terminals 6 may be connected to one charging line 3, and the other of the pair of connection terminals 6 may be connected to the other charging line 4.

The other end of the charging cable 1 may be provided with a connector 7 (see FIG. 1). The connector 7 may have a shape corresponding to a charging port of an electric vehicle and may comprise a charging terminal and a communication terminal connected to the electric vehicle.

The charging cable 1 may further comprise a cooling fluid supply unit 8 (see FIG. 1) and a cooling fluid recovery unit 9 (see FIG. 1).

The cooling fluid supply unit 8 may supply the cooling fluid C to the inner flow path IF. A supply flow path communicating with the inner flow path IF may be formed in the cooling fluid supply unit 8. An example of the cooling fluid supply unit 8 may be a supply tube with a supply flow path formed therein. The cooling fluid supply unit 8 may be connected to one side of the charging line 3.

The cooling fluid recovery unit 9 may guide the cooling fluid C that has passed through the outer flow path OF. The cooling fluid recovery unit 9 may be formed with a recovery flow path communicating with the outer flow path OF. An example of the cooling fluid recovery unit 9 may be a recovery tube with a recovery flow path formed therein. The cooling fluid recovery unit 9 may be connected to one side of the outer tube 2.

An example of the cooling fluid C may be water, a coolant such as antifreeze or glycerin, or a refrigerant that can change phase (liquefy or vaporize) according to the temperature changes.

When the cooling fluid C is coolant, the cooler may comprise a radiator (heat dissipation unit) capable of cooling the coolant, a pump capable of circulating the coolant to a charging cable 1 and the radiator, and the like. In this case, either the cooling fluid supply unit 8 or the cooling fluid recovery unit 9 may be connected to a radiator, and the cooling fluid supply unit 8 and the cooling fluid recovery unit 9 may be connected to a pump.

The coolant cooled by the radiator may be supplied to the inner flow path IF through the cooling fluid supply unit 8, and the coolant leaked from the outer flow path OF may be recovered to the radiator through the cooling fluid recovery unit 9. The cooling fluid C may cool the charging cable 1 while circulating through the charging cable 1 and the radiator.

The cooler is also capable of cooling the cooling fluid C through an intermediate heat exchanger.

When the cooler comprises an intermediate heat exchanger that cools the cooling fluid C, the cooler may further comprise a pump that circulates the cooling fluid C to the intermediate heat exchanger and the charging cable 1.

The cooler may be connected to an intermediate heat exchanger and comprise a refrigeration cycle device including the intermediate heat exchanger, and the refrigeration cycle device may comprise a compressor, a condenser, an expansion mechanism, and an intermediate heat exchanger (evaporator). One of the cooling fluid supply port 8 and the cooling fluid recovery unit 9 may be connected to an intermediate heat exchanger, and the other of the cooling fluid supply port 8 and the cooling fluid recovery unit 9 may be connected to a pump. In this case, an example of the cooling fluid C may be coolant.

The intermediate heat exchanger can heat exchange the refrigerant circulating through the compressor, the condenser, the expansion mechanism, the intermediate heat exchanger, and the cooling fluid C circulating through the charging cable 1 and the intermediate heat exchanger, and, for example, the intermediate heat exchanger may be configured as a plate heat exchanger or a double pipe heat exchanger.

The intermediate heat exchanger may be formed with a refrigerant flow path through which the refrigerant passes and a cooling fluid flow path through which the cooling fluid C passes. The intermediate heat exchanger may further comprise a heat transfer member that transfers heat between the refrigerant passing through the refrigerant flow path and the cooling fluid C passing through the cooling fluid flow path.

The cooling fluid C may be recovered to the intermediate heat exchanger through the inner flow path IF, the cooling fluid recovery hole 55, the outer flow path OF, and the cooling fluid recovery unit 9, and after the cooling fluid is cooled by the intermediate heat exchanger, the cooling fluid may be supplied to the inner flow path IF through the cooling fluid supply unit 8.

When the cooling fluid C is a refrigerant, examples of coolers may comprise refrigerant-cooled coolers. An example of cooling fluid (C) may be R134a or the like.

The charging cable 1 may be a direct expansion heat exchanger or a direct expansion evaporator, and the cooler may comprise a compressor connected to the charging cable 1, a condenser connected to the compressor, and an expansion mechanism such as an expansion valve connected to the condenser and the charging cable. In this case, the cooling fluid supply unit 8 may be connected to the expansion mechanism to guide the refrigerant passing through the expansion mechanism to the inner flow path IF, and the cooling fluid recovery unit 9 is connected to the compressor to guide the refrigerant that has passed through the outer flow path OF to the compressor.

When the cooling fluid C is a refrigerant, the change in density of the refrigerant due to heat transfer of the refrigerant may be large, and the cross-sectional area of the inner flow path IF may be different from the cross-sectional area of the outer flow path OF. It is preferable that the cross-sectional area of the inner flow path IF is smaller than the cross-sectional area of the outer flow path OF.

When the cooling fluid C is a refrigerant, the densities of the refrigerant before and after heat exchange may differ by 5 times or more, and the cross-sectional area of the outer flow path OF may be formed to be larger than the cross-sectional area of the inner flow path IF, and in this case, the pressure loss of the refrigerant can be minimized.

FIG. 6 is a partial cutaway perspective view illustrating a comparative example compared to an example of a charging cable according to the present embodiment.

The charging cable of the comparative example may comprise an outer tube 2, charging lines 3' and 4', and a communication line 5. The configuration of the outer tube 2 and the communication line 5 may be the same as that of the charging cable of the present embodiment.

The charging lines 3' and 4' may have a plurality of charging conductors 31' disposed inside the hollow insulating body 32'. A plurality of charging conductors 31' may be filled in the space formed inside the insulating body 32'. An inner flow path through which cooling fluid passes may not be formed inside the charging lines 3' and 4'.

In the charging cable of the comparative example, an outer flow path OF may be formed between the outer circumference of the charging line 3', 4', the outer circumference of the communication line 5, and the inner circumference of the outer tube (2, and the cooling fluid may flow into the outer flow path OF and pass through the outer flow path OF, and may flow out from the outer flow path OF.

In the comparative example, the flow and heat transfer of the cooling fluid may occur only through the outer flow path OF of the charging cable, and the heat transfer area of the cooling fluid C may be smaller than that of the present embodiment.

In the comparative example, there is a disadvantage that, among the plurality of charging conductors 31', cooling is performed mainly on the charging conductor 31' relatively close to the insulating body 32', and cooling is not quickly performed on all charging conductors 31' of the charging conductors 3' and 4'.

On the other hand, in the charging cable 1 of the present embodiment, all charging conductors 31 can be cooled evenly and quickly by the inner flow path IF.

FIG. 7 is a perspective view illustrating a supporter according to the present embodiment, FIG. 8 is a cross-sectional view illustrating an example in which the supporter according to the present embodiment is installed inside the outer tube, and FIG. 9 is a perspective view illustrating an example in which the supporter according to the present embodiment is installed inside the outer tube.

The charging cable may comprise a supporter 10.

The supporter 10 may be placed inside the outer tube 2. The supporter 10 may support each of a pair of charging lines 3 and 4 and a communication line 5.

The supporter 10 may support a pair of charging lines 3 and 4 and a communication line 5 so that the pair of charging lines 3 and 4 and a communication line 5 are spaced apart from each other. A pair of charging lines 3 and 4 and a communication line 5 may be supported by a supporter 10 to be spaced apart from the outer tube 2.

The supporter 10 may support the charging lines 3 and 4 and the communication line 5 so that the outer circumference of the charging line 3, 4 and the outer circumference of the communication line 5 are spaced apart from the inner circumference of the outer tube 2.

The supporter 10 may comprise charging line through-holes 101 and 102 through which the charging lines 3 and 4 pass, and a communication line through-hole 104 through which the communication line 5 passes.

Like the charging lines 3 and 4, the charging line through-holes 101 and 102 may have alternating peaks and valleys. The charging lines 3 and 4 may be supported by peripheral portions of the charging line through-holes 101 and 102.

The communication line through-hole 104 may be circular, like the communication line 5. The communication line 5 may be supported by the peripheral portion of the communication line through-hole 104.

The outer circumference 105 of the supporter 10 may be circular, and the outer circumference 104 of the supporter 10 may be in contact with the inner circumference of the outer tube 2.

A plurality of through-holes 106 may be formed in the supporter 10. Each of the plurality of through-holes 105 may be spaced apart from each of the charging line through-holes 101 and 102 and the communication line through-holes 104.

A plurality of through-holes 106 may be formed between the charging line through-holes 101 and 102 and the outer circumference 105 of the supporter 10. A plurality of through-holes 106 may be formed between the communication line through-hole 104 and the outer circumference 106 of the supporter 10. A plurality of through-holes 106 may be formed between the charging line through-holes 101 and 102 and the communication line through-holes 104.

When the cooling fluid C passes through the inside of the outer tube 2, the bias towards one side can be minimized by the supporter 10, and the charging cable 1 can be cooled the charging lines 3 and 4 and the communication line 5 as uniformly as possible.

FIG. 10 is a view illustrating a first modified example of an insulating body according to the present embodiment.

As illustrated in FIG. 10, the insulating body 32 may have peaks 32c and valleys 32d alternately formed in the circumferential direction, and each of the peaks 32c and valleys 32d may have a curved shape.

Each of the peaks 32c and the valleys 32d may be formed on at least one of the outer circumference and the inner circumference of the insulating body 32.

As the insulating body 32 has peaks 32c and valleys 32d alternately formed in the circumferential direction, the heat transfer area with the cooling fluid C may increase.

FIG. 11 is a view illustrating a second modified example of the insulating body according to the present embodiment.

As illustrated in FIG. 11, the insulating body 32 may comprise an uneven portion 32e. The uneven portion 32e may be formed on at least one of the inner circumference and the outer circumference of the insulating body 32.

The uneven portion 32e may comprise a plurality of protrusions and grooves formed between the plurality of protrusions.

The insulating body 32 may have an increased heat transfer area with the cooling fluid C due to the uneven portion 32e.

FIG. 12 is a view illustrating a third modified example of the insulating body according to the present embodiment.

The insulating body 32 may comprise a porous member 32f, as illustrated in FIG. 12. The porous member 32f may be formed in a portion of the insulating body 32.

The insulating body 32 may have an increased heat transfer area with the cooling fluid C due to the porous member 32f.

FIG. 13 is a view illustrating a fourth modified example of the insulating body according to the present embodiment.

A flow guide 36 that guides the flow of the cooling fluid C may protrude from the insulating body 32. The flow guide 36 may be formed to be long on at least one of the outer circumference and the inner circumference of the insulating body 32.

One example of the flow guide 36 may be a spiral shape.

A plurality of flow guides 36 may be formed on the inner or outer circumference of the insulating body 32.

The plurality of flow guides 36 may be spaced apart in the circumferential direction R of the insulating body 32. The plurality of flow guides 36 may be spaced apart in the longitudinal direction L of the insulating body 32.

The insulating body 32 may comprise a plurality of rows of flow guide groups 37 and 38 spaced apart in the longitudinal direction L of the insulating body 32.

Each of the plurality of rows of flow guide groups 37 and 38 may comprise a plurality of flow guides 36 spaced apart in the circumferential direction R.

The plurality of rows of flow guide groups 37 and 38 may be two or more flow guide groups, or three or more rows of flow guide groups, however, for convenience of explanation, it is explained that two or more rows of flow guide groups 37 and 38 are formed, but it is not limited to two or more rows of flow guide groups.

The plurality of rows of flow guide groups 37 and 38 may comprise an upstream flow guide group 37 in the flow direction of the cooling fluid C, and a downstream flow guide group 38 located downstream of the upstream flow guide group 37 in the flow direction of the cooling fluid C.

The spiral directions of the flow guide 36 of the upstream flow guide group 37 and the flow guide 36 of the downstream flow guide group 38 may be the same or different.

The spacing between adjacent flow guides 36 in the upstream flow guide group 37 may be the same as or different from the spacing between adjacent flow guides 36 in the downstream flow guide group 38.

FIG. 13 (a) is a view illustrating an example of a plurality of flow guide groups.

As an example of the plurality of flow guide groups 37 and 38, as illustrated in FIG. 13 (a), the flow guide 36 of the upstream flow guide group 37 may be directed to the flow guide 36 of the downstream flow guide group 38 in a spiral direction.

FIG. 13 (b) is a view illustrating another example of a plurality of flow guide groups.

As another example of the plurality of flow guide groups 37 and 38, as illustrated in FIG. 13 (b), the flow guide 36 of the upstream flow guide group 37 can be directed between adjacent flow guides 36 of the downstream flow guide group 38 in a spiral direction.

FIG. 13 (c) is a view illustrating another example of a plurality of flow guide groups.

Another example of a plurality of flow guide groups 37 and 38 may be different from the flow guide spiral direction of the upstream flow guide group 37 and the flow guide spiral direction of the downstream flow guide group 37, as illustrated in FIG. 13 (c). The spiral direction of the flow guide 36 of the upstream flow guide group 37 and the spiral direction of the flow guide 36 of the downstream flow guide group 37 may have an inclination angle of a right angle or an obtuse angle.

The insulating body 32 with the flow guide 36 protruding as described above can increase the heat transfer area with the cooling fluid C and cool the charging conductor 31 more quickly and evenly.

The above description is merely an illustrative explanation of the technical idea of the present disclosure, and various modifications and variations will be possible to those skilled in the art without departing from the essential characteristics of the present disclosure.

Accordingly, the embodiments disclosed in the present disclosure are not intended to limit the technical idea of the present disclosure, but rather to explain it, and the scope of the technical idea of the present disclosure is not limited by these embodiments.

The scope of protection of the present disclosure should be interpreted in accordance with the claims below, and all technical ideas within the equivalent scope should be construed as being comprised in the scope of rights of the present disclosure.

The invention claimed is:

1. A charging cable comprising:
   an outer tube; and
   at least one charging line disposed inside the outer tube,
   wherein an outer flow path through which cooling fluid passes is formed between the outer tube and the at least one charging line,
   wherein the charging line comprises:
   at least one charging conductor; and
   an insulating body surrounding an outer circumference of the at least one charging conductor, and
   wherein an inner flow path through which cooling fluid passes is formed in the insulating body,
   wherein the insulating body comprises:

an inner circumference forming the inner flow path; and
an outer circumference spaced apart from an inner circumference of the outer tube.

2. The charging cable of claim 1,
wherein the inner flow path is formed inside the insulating body.

3. The charging cable of claim 1, further comprising:
a cooling fluid supply unit configured to supply cooling fluid to the inner flow path, and
a cooling fluid recovery unit through which the cooling fluid passing through the outer flow path is guided.

4. The charging cable of claim 3,
wherein a cross-sectional area of the inner flow path is smaller than a cross-sectional area of the outer flow path.

5. The charging cable of claim 1,
wherein the insulating body comprises peaks and valleys which are alternately formed in a circumferential direction.

6. The charging cable of claim 1,
wherein the insulating body comprises uneven portions.

7. The charging cable of claim 1,
wherein the insulating body comprises a porous member.

8. The charging cable of claim 1,
wherein a flow guide protrudes from the insulating body to guide a flow of cooling fluid.

9. The charging cable of claim 8,
wherein the flow guide has a spiral shape.

10. A charging cable comprising:
an outer tube; and
at least one charging line disposed inside the outer tube,
wherein an outer flow path through which cooling fluid passes is formed between the outer tube and the at least one charging line,
wherein the charging line comprises:
at least one charging conductor; and
an insulating body surrounding an outer circumference of the at least one charging conductor, and
wherein an inner flow path through which cooling fluid passes is formed in the insulating body.
wherein the insulating body comprises a plurality of insulating portions surrounding the charging conductor, and
wherein adjacent insulating portions are connected to a bridge portion.

11. The charging cable of claim 10,
wherein the bridge portion comprises a cooling fluid recovery hole through which cooling fluid passes.

12. The charging cable of claim 11,
wherein the cooling fluid recovery hole is formed to be long in a longitudinal direction of the insulating body.

13. A charging cable comprising:
an outer tube; and
at least one charging line disposed inside the outer tube,
wherein an outer flow path through which cooling fluid passes is formed between the outer tube and the at least one charging line,
wherein the charging line comprises:
at least one charging conductor; and
an insulating body surrounding an outer circumference of the at least one charging conductor, and
wherein an inner flow path through which cooling fluid passes is formed in the insulating body,
the charging cable further comprising:
a communication line disposed inside the outer tube,
wherein the inner flow path is formed inside an inner circumference of the insulating body, and
wherein the outer flow path is formed between an outer circumference of the charging line, an outer circumference of the communication line, and an inner circumference of the outer tube.

14. The charging cable of claim 13, further comprising:
a supporter disposed inside the outer tube,
wherein the supporter comprises:
a charging line through-hole through which the charging line passes, and
a communication line through-hole through which the communication line passes, and
wherein the supporter supports the charging line and the communication line so that the outer circumference of the charging line and the outer circumference of the communication line are spaced apart from the inner circumference of the outer tube.

* * * * *